United States Patent [19]
Schmid

[11] Patent Number: 5,842,344
[45] Date of Patent: Dec. 1, 1998

[54] LINEAR DRIVE FOR A BELT PRETENSIONER

[75] Inventor: Johannes Schmid, Schwäbisch Gmünd, Germany

[73] Assignee: TRW Occupant Restraint Systems GmbH, Alfdorf, Germany

[21] Appl. No.: 760,907

[22] Filed: Dec. 6, 1996

[30] Foreign Application Priority Data

Dec. 21, 1995 [DE] Germany .................. 295 20 307 U

[51] Int. Cl.⁶ .................................................. F01B 29/08
[52] U.S. Cl. ................................................ 60/632; 242/374
[58] Field of Search ........................ 60/632, 638; 242/374

[56] References Cited

U.S. PATENT DOCUMENTS 5,641,131  6/1997  Schmid et al. ........................ 242/374

FOREIGN PATENT DOCUMENTS

| | | |
|---|---|---|
| 0649779 | 10/1994 | European Pat. Off. . |
| 4227781 | 2/1994 | Germany . |
| 49-124731 | 2/1973 | Japan . |
| 49-135924 | 3/1973 | Japan . |
| 50-31523 | 3/1975 | Japan . |
| 63-154371 | 10/1988 | Japan . |
| 06344863 | 12/1994 | Japan . |

*Primary Examiner*—Noah P. Kamen
*Attorney, Agent, or Firm*—Tarolli, Sundheim, Covell, Tummino ! Szabo

[57] ABSTRACT

A linear drive for a belt pretensioner is provided. The linear drive includes a cylinder tube with a hollow inner space, a pyrotechnic drive charge which generates a pressurized gas, and a piston able to be displaced in the inner space of the cylinder tube under the action of the pressurized gas. The piston has a hollow interior space and an axial end having an end wall. The end wall has a passage opening which is closed by a blow-out patch.

6 Claims, 8 Drawing Sheets

LINEAR DRIVE FOR A BELT PRETENSIONER

TECHNICAL FIELD

The invention relates to a linear drive for a belt pretensioner.

BACKGROUND OF THE INVENTION

A linear drive for a belt pretensioner is disclosed in DE-A 44 15 109. The linear drive disclosed in DE-A 44 15 109 comprises a cylinder tube and a piston arranged for sliding movement in the cylinder tube. The piston has a hollow interior space and an end wall at one axial end. The piston includes a pyrotechnic drive charge which, after being fired, causes the interior space of the piston to be subjected to gas under pressure. The pyrotechnic drive charge is fired in the event of a vehicle collision so that, under the action of the gas produced by the drive charge, the piston performs a tensioning stroke which is converted by the belt pretensioner into rotation of a belt drum of a belt retractor in a belt take-up direction. As a result, belt slack is removed from the belt system so that the vehicle occupant participates in vehicle deceleration from the earliest possible point in time in an accident.

One problem with the aforementioned linear drive is inadvertent firing of the pyrotechnic drive charge under unfavorable conditions, such as during over-heating of the vehicle following a fire in the vehicle, or when the vehicle occupant has already been displaced forward. DE-A 44 15 109 discloses designing the cylinder tube to be burst-proof and thus effective to prevent any danger resulting from the inadvertent firing of the drive charge under unfavorable conditions. Such a design results, however, in an increase in weight.

SUMMARY OF THE INVENTION

The present invention provides a linear drive which has a reduced weight and which is safe from bursting of the cylinder tube.

According to the invention, a linear drive for a belt pretensioner comprises a cylinder tube with a hollow inner space, a pyrotechnic drive charge which generates a pressurized gas, and a piston able to be displaced in the inner space of the cylinder tube under the action of the pressurized gas. The piston has a hollow interior space and an axial end having an end wall. The end wall has a passage opening which is closed by a blow-out patch. The blow-out patch clears the passage opening when there is excessive pressure in the interior space of the piston so that such pressure may be released from the interior space of the piston to forestall bursting of the cylinder tube without having to be particularly massive in design. By appropriate selection of the dimensions of the blow-out patch, the maximum pressure obtained in the interior space of the piston may be set and adapted to the respective conditions.

In accordance with a preferred development of the invention, the blow-out patch has a calibrated discharge flow opening which faces the passage opening. This design offers, in addition to a limitation of the maximum pressure occurring in the interior space of the piston, certain advantages regarding the behavior of the linear drive after belt pretensioning has taken place, particularly when the belt drum is connected with an energy receiving device such as a torsion rod adapted to take up load peaks in the belt system. Such an energy take-up device is described in DE-A 42 27 781. After the completion of belt pretensioning, the belt drum revolves in the pay-out direction against the action of the energy take-up device. Due to the coupling of the belt drum with the linear drive, the piston of the linear drive reverses its movement toward its initial position. Having the discharge opening in the interior space of the piston ensures that, upon the aforementioned reverse movement of the piston, no gas pressure opposes such reverse motion. The discharge opening is also responsible for pressure losses during the tensioning stroke of the piston. However, since the reverse motion of the piston takes place very slowly as compared with the tensioning stroke, a comparatively small discharge opening will be sufficient for venting of the interior space of the piston during the reverse motion of the piston so that pressure losses during rapid tensioning movement of the piston are low. Furthermore, such low pressure losses may be compensated for by having a higher output pyrotechnic drive charge.

Another preferred feature of the invention is that the blow-out patch is press-fitted in the interior space to ensure a particularly firm positioning of the blow-out patch in the interior space of the piston.

As an alternative to the press-fitted blow-out patch design, the patch may have a tubular attachment skirt which extends through the passage opening and secures the blow-out patch to the end wall by a crimped-over edge. In this manner, a particularly reliable attachment of the blow-out patch to the end wall is obtained.

In accordance with a further preferred embodiment of the invention, the blow-out patch has a connection part extending through the passage opening and connected with a tear-off part engaging the interior wall surface of the cylinder tube. The tear-off part is able to be shifted in the cylinder tube in a direction in accordance with the direction of motion of the piston on firing of the drive charge while becoming locked in the cylinder tube upon movement of the piston in the opposite direction. Further, upon continued movement of the piston, the connection part tears from the blow-out patch to clear the passage opening. According to this design, it is possible to attain the same advantageous effects as described for the other embodiments, but without pressure losses during the tensioning stroke.

Preferably, the blow-out patch is made of a metallic foil. This leads to high reproducibility of the pressure values at which the passage opening is cleared since metallic foil can be produced with tight tolerances and its burst pressure is relatively unaffected by changes in temperature.

BRIEF DESCRIPTION OF THE DRAWINGS

The foregoing and other features of the invention will become more apparent to one skilled in the art upon consideration of the following description of the invention and the accompanying drawings in which.

DETAILED DESCRIPTION OF PREFERRED EMBODIMENTS

Figure 1:
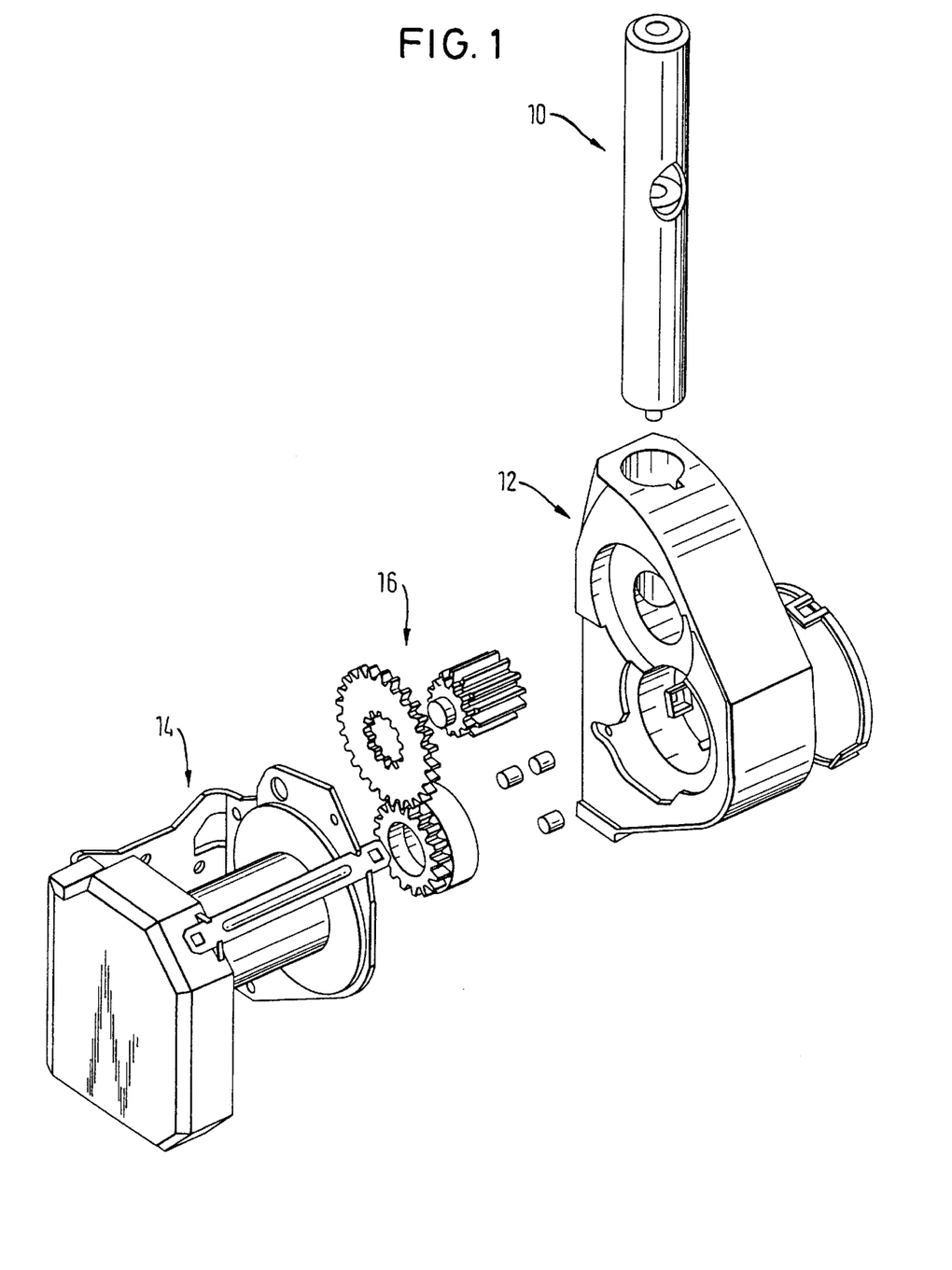
FIG. 1 is an exploded perspective view of a linear drive in accordance with the invention with a belt pretensioner and a belt retractor.

FIG. 1 shows a linear drive 10 constructed in accordance with the invention together with an associated belt pretensioner 12 and a belt retractor 14. The belt pretensioner 12 is arranged to act on the belt retractor 12 via gearing 16.

Figure 2:
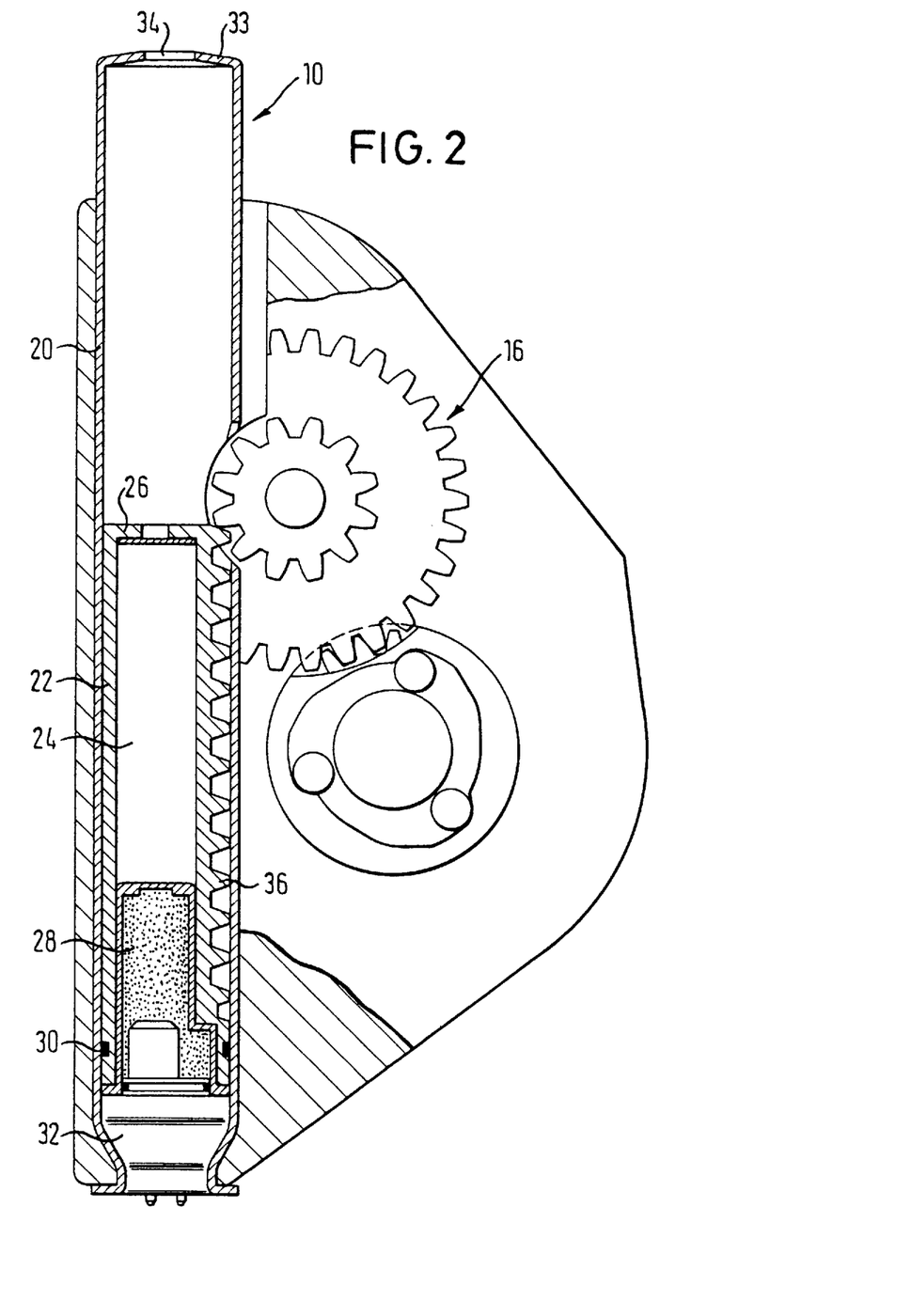
FIG. 2 diagrammatically shows a section taken through a linear drive in accordance with the invention as a first embodiment in the initial position.

As shown in FIG. 2, the linear drive 10 comprises a cylinder tube 20 and a piston 22 adapted to move inside the cylinder tube. The piston 22 has a hollow interior space 24 having an end wall 26 at one end and a pyrotechnic drive charge 28 at the opposite axial end. A seal ring 30 is arranged between the cylinder tube 20 and the piston 22. On the lowermost (as viewed in FIG. 2) end of the cylinder tube 22, the cylinder tube is shut off by a plug 32. The plug 32 contains the electrical ignition contacts for firing the drive charge 28. At the opposite end of the cylinder tube 20, the cylinder tube has a piston catcher 33 with an opening 34. The opening 34 vents the cylinder tube 20 during a tensioning stroke of the piston 22.

Figure 3:
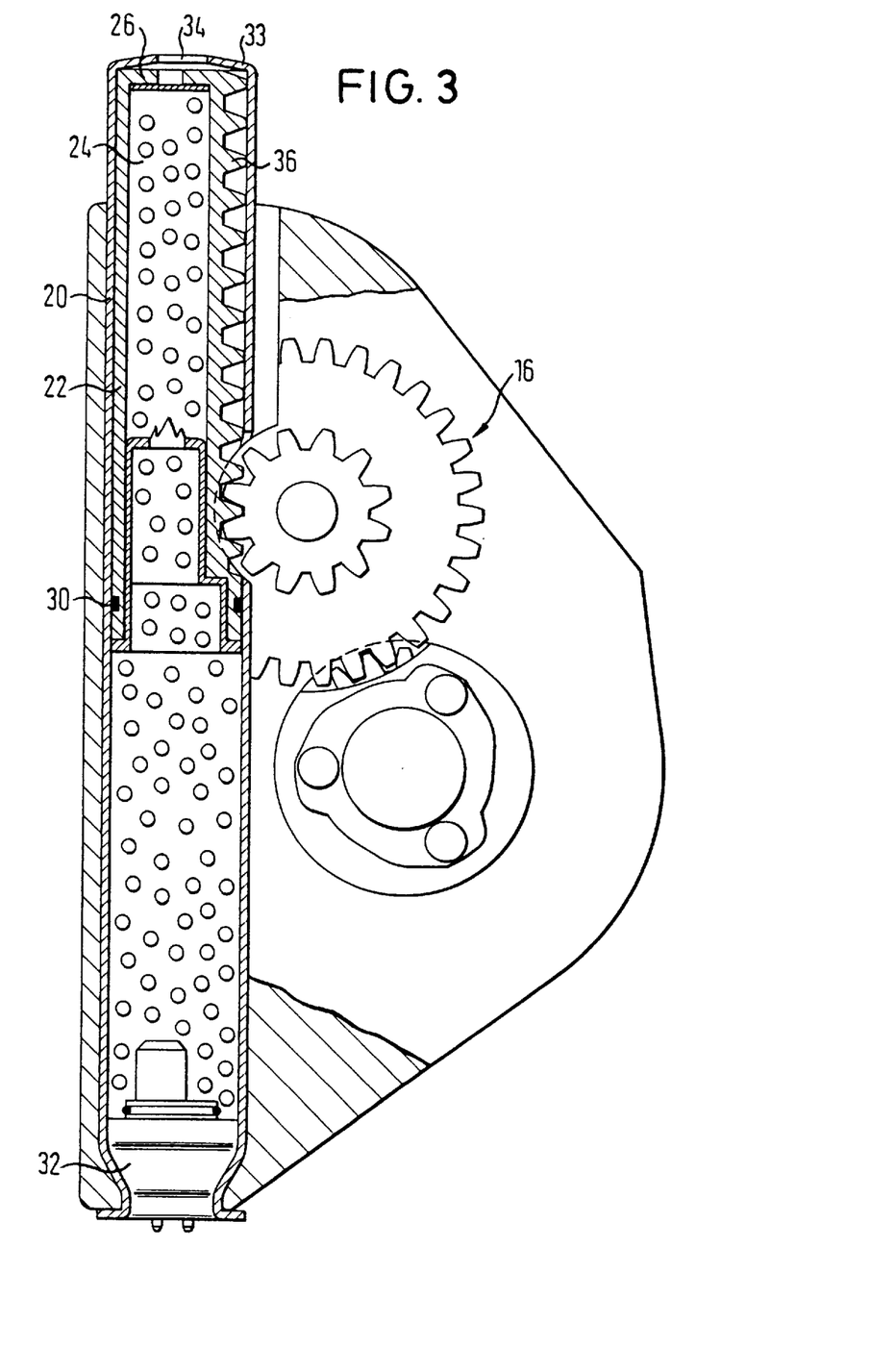
FIG. 3 diagrammatically shows a section taken through the linear drive of FIG. 2 after the tensioning stroke has been completed.

On an outer axially extending surface, the piston 22 has gearing teeth 36 extending in parallel with its longitudinal axis and cooperating with a gear wheel of the gearing 16 in order to convert a tensioning stroke of the piston 22 into rotary motion. The rotary motion is transmitted to the belt drum of the belt retractor 14 as rotation in the belt take-up direction. The tensioning stroke occurs when the drive charge 28 is fired. The drive charge, when fired, produces gas under pressure which is directed into the interior space of the piston and which leads to a displacement of the piston 22 in the cylinder tube 20. FIG. 3 illustrates the condition of the linear drive after the completion of a tensioning stroke.

Figure 4:
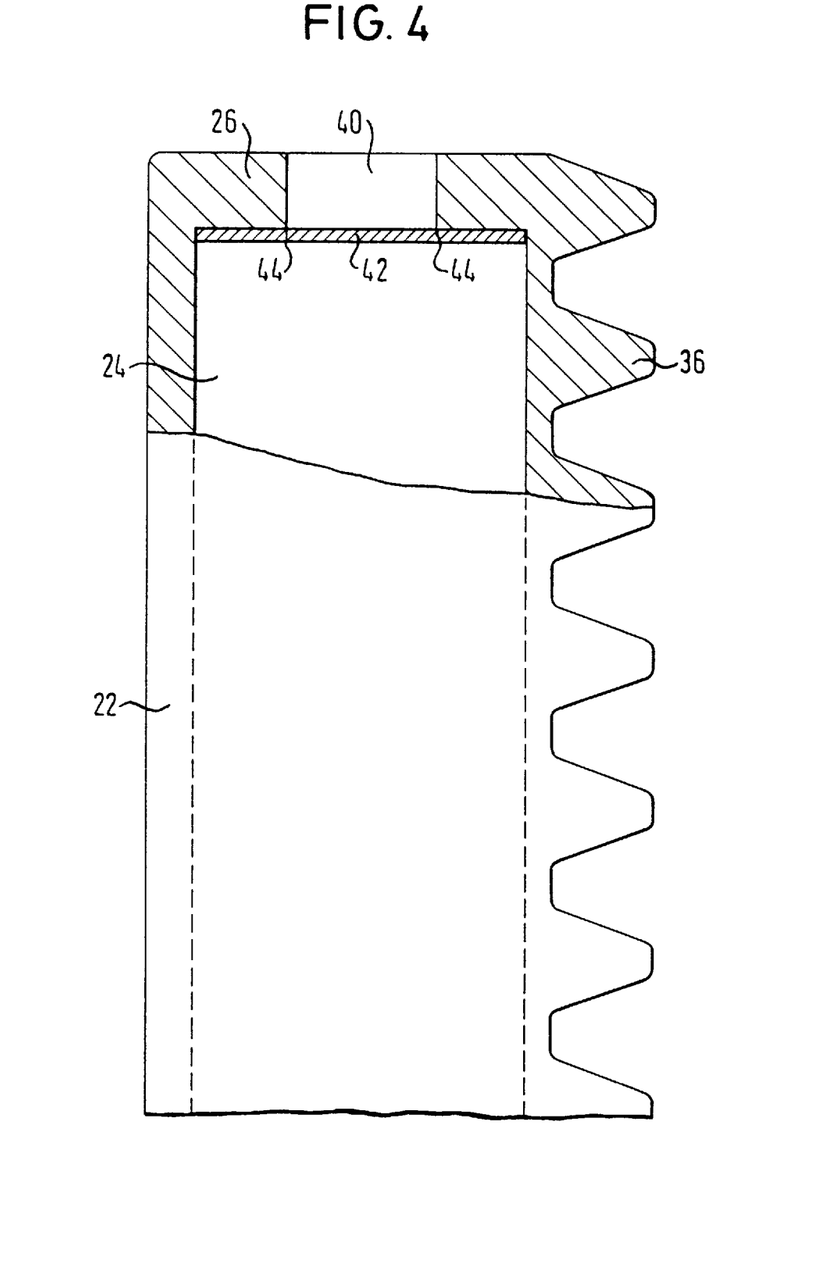
FIG. 4 shows part of the linear drive of FIG. 2 on a larger scale.

FIG. 4 shows the end of the piston 22 with the end wall according to a first embodiment of the invention. The end wall has a passage opening 40 extending in the longitudinal direction of the piston. A blow-out patch 42 is arranged on the end wall on the side facing into the interior space. The blow-out patch 42 shuts off the passage opening 40. The blow-out patch 42 is provided with points 44 of intended weakness to ensure that when the pressure in the interior space 24 of the piston 22 exceeds a predetermined maximum pressure, the passage opening 40 is cleared and the gas under pressure escapes from the interior space of the piston 22. One advantageous feature of the present invention is that if the piston 22 should jam in the initial position upon firing of the drive charge 28, excessively high gas pressure will not build up in the interior of the piston 22.

The blow-out patch 42 is made of a metallic foil press-fitted in the piston. Use of a metallic foil ensures high reproducibility of the pressure values at which the passage opening 40 is cleared because such metallic foil components can be produced with very tight tolerances and are relatively unaffected by changes in temperature. Moreover, by making the blow-out patch 42 from metallic foil, fragmentation of the blow-out patch when the passage opening is cleared is avoided. Since the interior space in the piston 22 is sealed off completely by the blow-out patch 42 and by the seal ring 30, the entire gas pressure produced by the drive charge 28 is optimally converted into a tensioning stroke.

Figure 5:
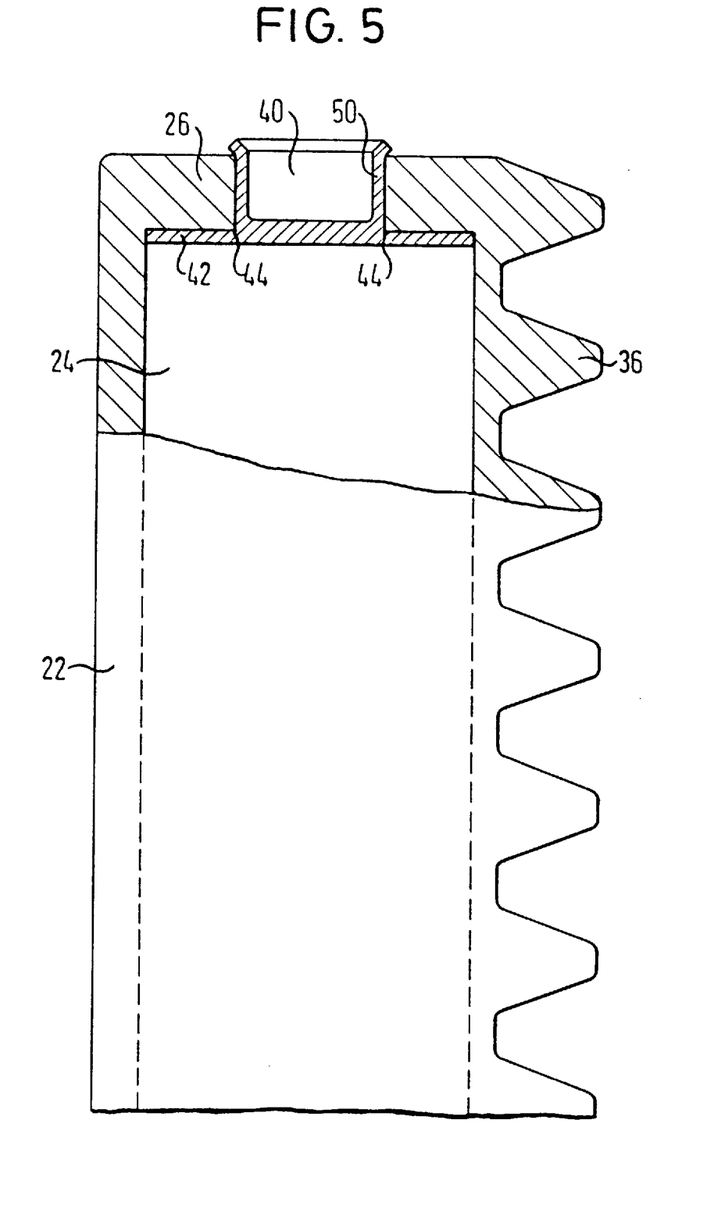
FIG. 5 is an elevational view corresponding to FIG. 4 showing a second embodiment of the invention.

FIG. 5 shows the end of the piston 22 with the end wall according to a second embodiment of the invention. The blow-out patch 42 is made of metallic foil and is provided with a tubular skirt 50. The skirt 50 extends through the passage opening and has free axial end which is crimped over the outer side of the end wall. In this manner, the blow-out patch 42 is reliably located on the end wall 26. The blow-out patch 42 has points 44 of intended weakness so that the blow-out patch 42 will clear the passage opening 40 when there is an excessively high pressure within the interior space of the piston 22.

Figure 6:
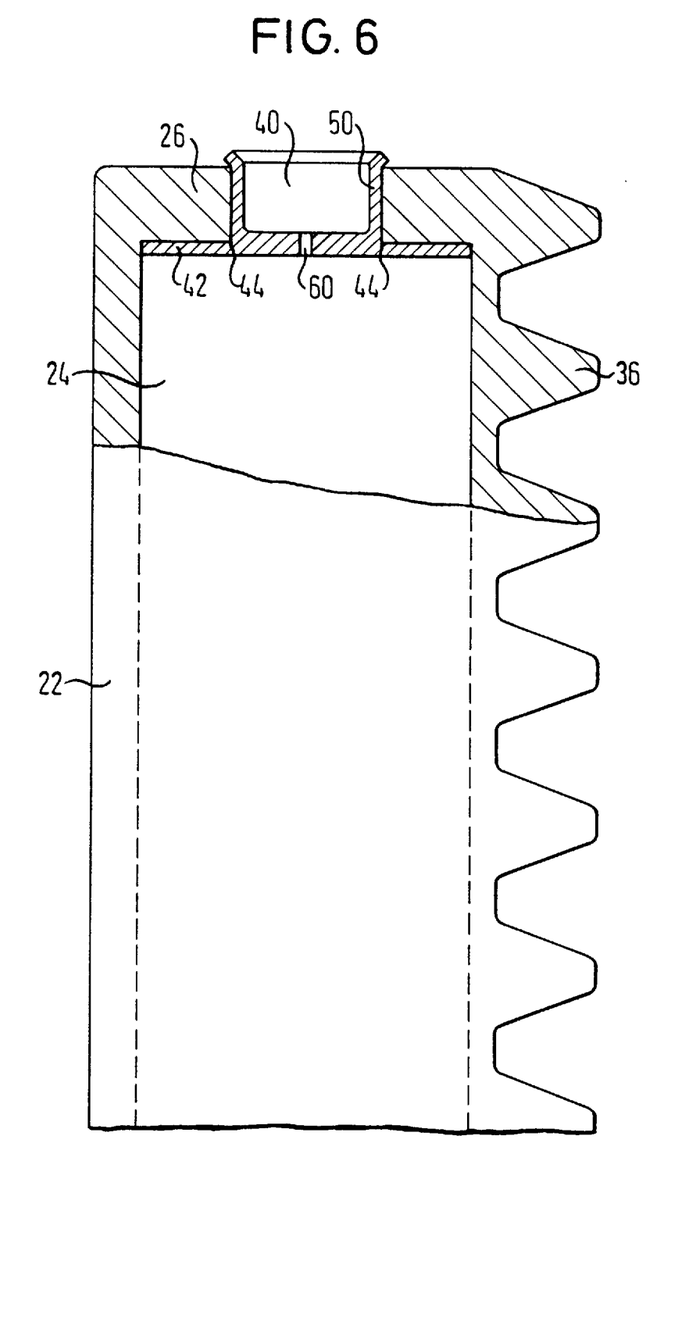
FIG. 6 is a view corresponding to FIG. 4 showing a third embodiment of the invention.

FIG. 6 shows the end of the piston 22 with the end wall according to a third embodiment of the invention. The blow-out patch 42 is generally the same as the blow-out patch of FIG. 5, except the blow-out patch according to the third embodiment possesses a calibrated discharge opening 60. The calibrated discharge opening 60 connects the interior space 24 of the piston 22 with the passage opening and, accordingly, with the exterior space of the piston. The calibrated discharge opening 60 preferably has a diameter of the order of 0.5 mm. The discharge opening 60 is permanently open. However, because of the relatively small diameter of the discharge opening 60, the losses in pressure occurring during a tensioning stroke of the piston 22 are comparatively small. These pressure losses can be compensated for by using a higher output drive charge. The function of the calibrated discharge opening 60 is to equalize the pressure in the interior space 24 of the piston 22 and the interior space of the cylinder tube 20 when, after completion of the tensioning stroke, the piston 22 moves back to its initial position. Due to the pressure equalization in the interior space 24 of the piston 22 and in the interior space of the cylinder tube 20, it is impossible for any gas pressure to establish itself in the interior space 24 of the piston 22 and thus oppose reverse motion of the piston 22 into the initial position. Accordingly, despite the coupling of the belt drum of the belt retractor with the linear drive, belt webbing may be drawn off of the belt drum.

Figure 7:
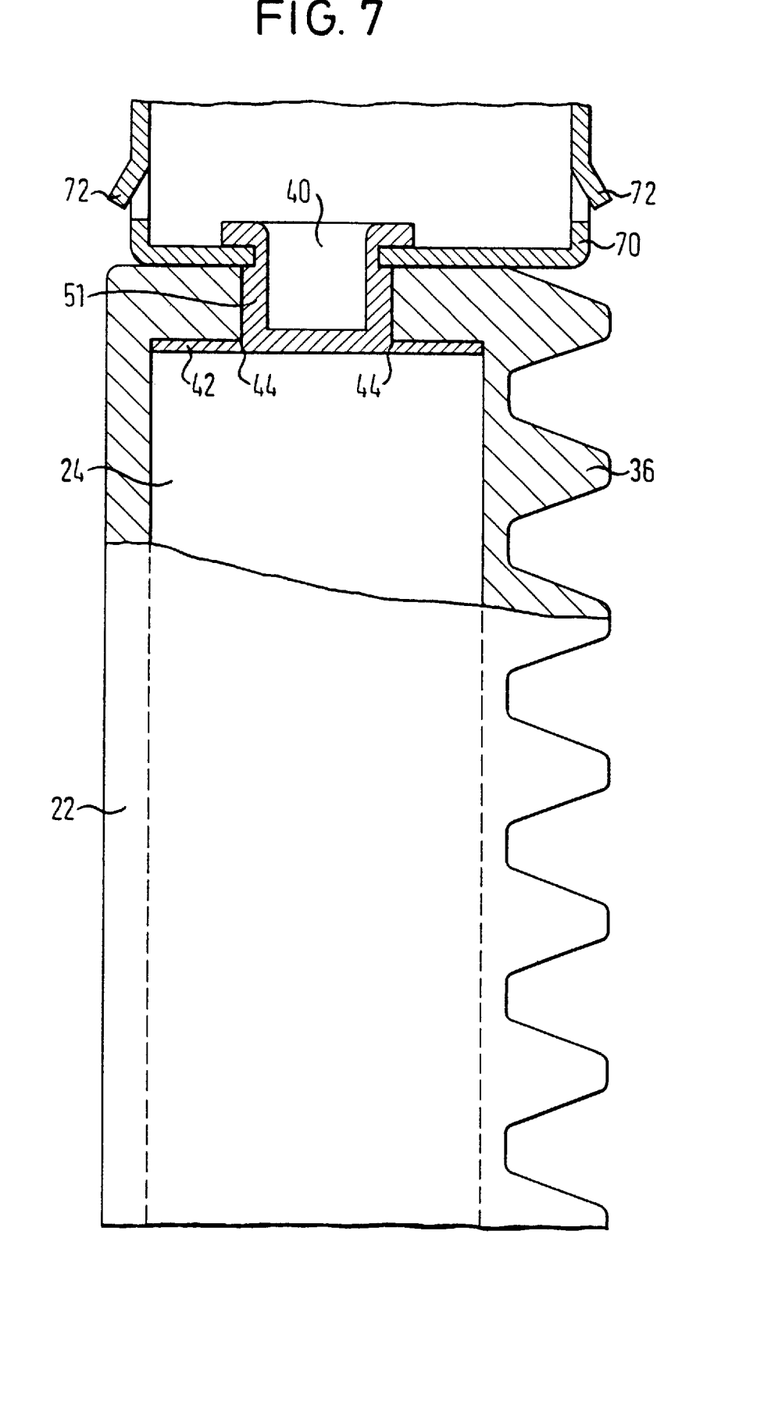
FIG. 7 is a view corresponding to FIG. 4 showing a fourth embodiment of the invention in the initial position.
Figure 8:
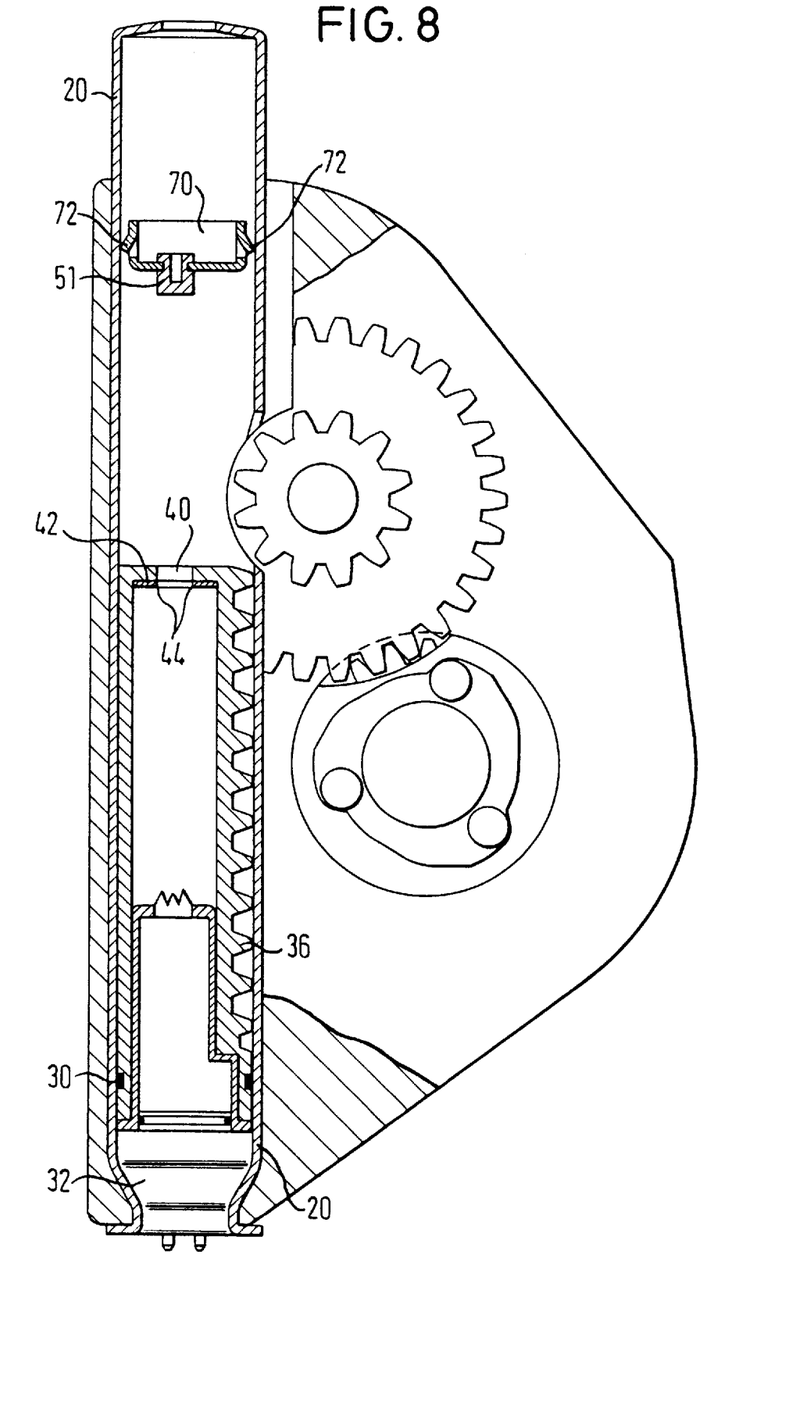
FIG. 8 is a diagrammatic section taken through the linear drive of the fourth embodiment of the invention after performance of the tensioning stroke and after completion of reverse motion of the piston into the initial position thereof.

FIGS. 7 and 8 diagrammatically depict the end of the piston with the end wall of a linear drive constructed according to a fourth embodiment of the invention. The blow-out patch 42 is substantially the same as that of the second embodiment, except that the blow-out patch has an attachment part 51 instead of the attachment skirt. The attachment part 51 is engaged by a tear-off part 70 which has locking lugs 72 in engagement with the internal wall surface of the cylinder tube 20. The locking lugs 72 are located to allow displacement of the tear-off part 70 in a direction corresponding to the direction of motion of the piston on firing the drive charge. However, upon movement of the piston in the opposite direction, the locking lugs 72 lock on the cylinder tube. Thus, upon reverse movement of the piston 22 towards the initial position after a tensioning stroke, the tear-off part 70 is jammed in the cylinder tube 20 and the connection part 51 is ripped off the blow-out patch 42. Accordingly, the passage opening 40 is cleared and the piston 22 may move back into its initial position without any gas pressure building up in its interior space 24 which would oppose such reverse movement. As compared to the third embodiment, the design of the linear drive in accordance with the fourth embodiment offers the advantage that, below the maximum pressure set by the dimensions of the points 44 of predetermined weakness, there will be no loss of pressure after firing of the drive charge 28 since the interior space 24 of the piston 22 is completely sealed off by the blow-out patch 42 and by the seal ring 30.

I claim:

1. A linear drive for a belt pretensioner, comprising a cylinder tube with a hollow inner space, a pyrotechnic drive charge which after being fired generates a pressurized gas, and a piston able to be displaced in said inner space of said cylinder tube under the action of said pressurized gas, said piston having a hollow interior space and an axial end at which an end wall is provided, said end wall being provided with a passage opening and said passage opening being closed by a blow-out patch.

2. The linear drive of claim 1, wherein said blow-out patch is press-fitted into said interior space of said piston.

3. The linear drive of claim 1, wherein said blow-out patch is provided with a tubular skirt, which extends through said passage opening and secures said blow-out patch in place at said piston by means of a crimped over edge.

4. The linear drive of claim 1, wherein said blow-out patch is provided with a connection part extending through said passage opening and which is connected with a tear-off part in engagement with an interior wall surface of said cylinder tube, said tear-off part being adapted to be shifted in a direction corresponding to a direction of movement of said piston on firing said drive charge while however being blocked in said cylinder tube in the case of a movement of said piston in an opposite direction and on continued movement of said piston tearing off said tear-off part from said blow-out patch, said passage opening being cleared.

5. The linear drive of claim 1, wherein said blow-out patch is provided with a calibrated discharge opening which is facing said passage opening.

6. The linear drive of claim 1, wherein said blow-out patch is constituted by a metallic foil.

* * * * *